(12) United States Patent
Veschi

(10) Patent No.: US 7,190,771 B2
(45) Date of Patent: Mar. 13, 2007

(54) INTERNET TELEPHONY DEVICES WITH CIRCUITY TO ANNOUNCE INCOMING CALLS

(75) Inventor: Robert A. Veschi, Germantown, MD (US)

(73) Assignee: Edge Access, Inc., St. Thomas (VG)

( * ) Notice: Subject to any disclaimer, the term of this patent is extended or adjusted under 35 U.S.C. 154(b) by 472 days.

(21) Appl. No.: 09/777,350

(22) Filed: Feb. 5, 2001

(65) Prior Publication Data

US 2001/0033647 A1 Oct. 25, 2001

Related U.S. Application Data

(60) Provisional application No. 60/180,382, filed on Feb. 4, 2000.

(51) Int. Cl.
*H04M 11/00* (2006.01)
(52) U.S. Cl. .................. 379/93.01; 379/88.01; 379/88.02; 379/372; 370/352; 370/354
(58) Field of Classification Search ............ 379/93.05, 379/93.09, 142.07, 100.15, 102.02, 102.03, 379/106.05, 106.04, 388.02, 418, 88.01, 379/88.02, 88.07, 372, 373.01, 93.01; 370/352, 370/354
See application file for complete search history.

(56) References Cited

U.S. PATENT DOCUMENTS

| | | | | |
|---|---|---|---|---|
| 4,227,055 A | * | 10/1980 | Hanson | 702/70 |
| 5,048,076 A | * | 9/1991 | Maurer et al. | 379/93.11 |
| 5,151,972 A | * | 9/1992 | Lorenz et al. | 379/100.16 |
| 5,408,529 A | * | 4/1995 | Greaves | 379/386 |
| 5,699,421 A | * | 12/1997 | Nirshberg et al. | 379/386 |
| 5,822,406 A | * | 10/1998 | Brown | 379/88.07 |
| 5,926,541 A | * | 7/1999 | Irie | 379/372 |
| 6,219,409 B1 | * | 4/2001 | Smith et al. | 379/106.09 |
| 6,226,303 B1 | * | 5/2001 | Levens et al. | 370/526 |
| 6,229,878 B1 | * | 5/2001 | Moganti | 379/67.1 |
| 6,364,834 B1 | * | 4/2002 | Reuss et al. | 600/300 |
| 6,480,581 B1 | * | 11/2002 | Wu et al. | 379/93.01 |
| 6,542,585 B2 | * | 4/2003 | Goodman | 379/93.01 |
| 6,636,506 B1 | * | 10/2003 | Fan | 370/356 |
| 6,650,635 B1 | * | 11/2003 | Weinstein et al. | 370/352 |
| 6,937,724 B1 | * | 8/2005 | Kozdon et al. | 379/420.01 |

\* cited by examiner

*Primary Examiner*—Matthew Anderson
*Assistant Examiner*—Tuan Pham
(74) *Attorney, Agent, or Firm*—Davidson Berquist Jackson & Gowdey LLP

(57) ABSTRACT

A system detects an incoming telephone call and routes the ring signal to a loudspeaker so that it can be heard at a distance from the telephony device. Once the incoming call has been acknowledged the incoming signal is routed to the headset. New incoming calls are identified by verifying the presence of unique characteristics that are found only in incoming calls. In a conventional telephone the unique characteristic can be a combination of frequencies which are part of the ring signal. The frequencies can be verified by using a bandpass filter which allows only frequencies centered around the ring frequency to pass. Therefore, if a signal of correct frequency is present it will pass through the bandpass filter and activate a switch that routes the signal to the loudspeaker.

27 Claims, 7 Drawing Sheets

INTERNET TELEPHONY DEVICES WITH CIRCUITY TO ANNOUNCE INCOMING CALLS

This application claims the priority of U.S. Provisional No. 60/180,382 filed on Feb. 4, 2000.

FIELD OF THE INVENTION

This invention relates generally to telephone systems, and more particularly to signaling incoming calls to recipients who otherwise may have difficulty hearing a telephone ring.

BACKGROUND OF THE INVENTION

In conventional telephone systems, incoming calls cause a ringing sound to alert the recipient. Typically, a mechanical switch called a "hook" relays the incoming call's ring signal to a bell or loudspeaker to sound as long as the handset is on the hook, and relays incoming signals to the low volume speaker in the handset for conversation when the handset is lifted off the hook.

Internet telephony stations based on personal computers in many cases use a headset as illustrated in FIG. 1, which positions a small speaker over one ear of a user and positions a microphone in front of the user's mouth. Headsets are used, instead of a computer's loudspeakers, because audio feedback from the loudspeakers into its microphone could interfere with telephone conversations. Since headset speakers are positioned close to the listener's ear, their volumes are low. When the headset is not being worn, and the computer's loudspeakers are not in use, possible rings of incoming calls could go unnoticed.

SUMMARY OF THE INVENTION

The present invention provides a system for announcing incoming calls at Internet telephone stations based on personal computers equipped with headsets. The invention includes a routing circuit formed preferably of two different frequency bandpass filters, two analog switches, an amplifier and a speaker.

Initially, the computer sound card supplies an analog signal to the routing circuit, in which filters pass bands centered on two selected frequencies, preferably 520 Hz and 3250 Hz, characteristic of telephone ringing signals. Either bandpass filter outputting a signal closes a respective analog switch which connects the original, unfiltered analog ringing signal to the loudspeaker. The two analog switches are connected in series, so they must both be activated by their respective bandpass filters to allow the original analog ring signal to pass through to the loudspeaker.

Since the 520 Hz and 3250 Hz frequencies are both characteristic of a ring signal and, in ordinary conversations, not likely to occur together, both frequencies being present simultaneously in an incoming signal reliably indicates that it is a ring signal, so it is connected to the speaker. When not both frequencies are present, the soundcard's original analog signal is routed to its usual conversational destination, the headset.

This invention routes incoming ring signals to a speaker remotely from the headset that can be heard to alert recipients of incoming calls, and then, when the recipient has answered the incoming call, routes the conversation signal to the headset.

These and other benefits and advantages of the invention will become more apparent upon reading the following Detailed Description with reference to the drawings.

DETAILED DESCRIPTION OF THE PREFERRED EMBODIMENT

The invention provides a system for extracting, routing and amplifying ring signals for incoming telephone calls.

Figure 1:
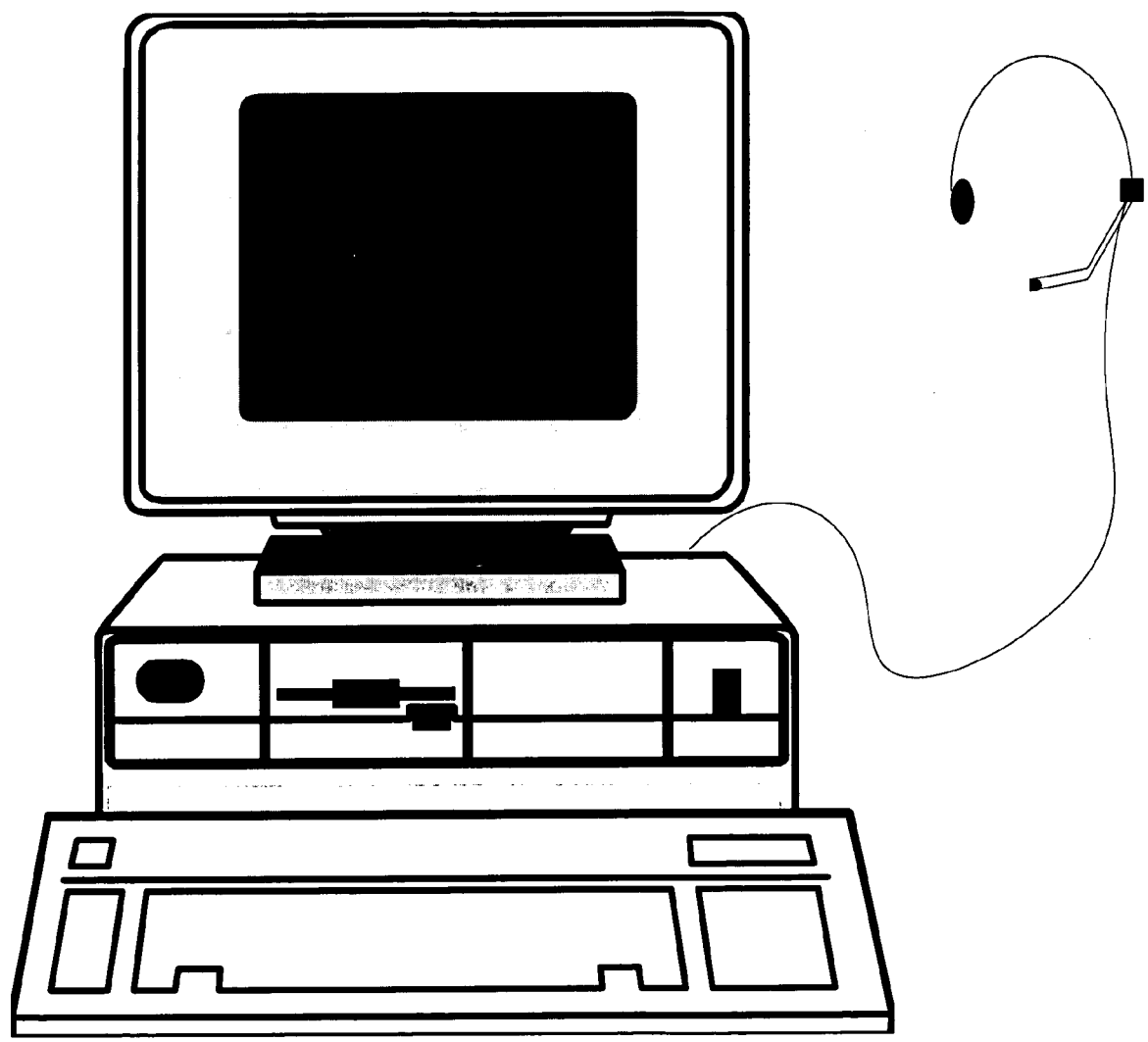
FIG. 1 illustrates a prior art personal computer-based telephone with a headset.
Figure 2:
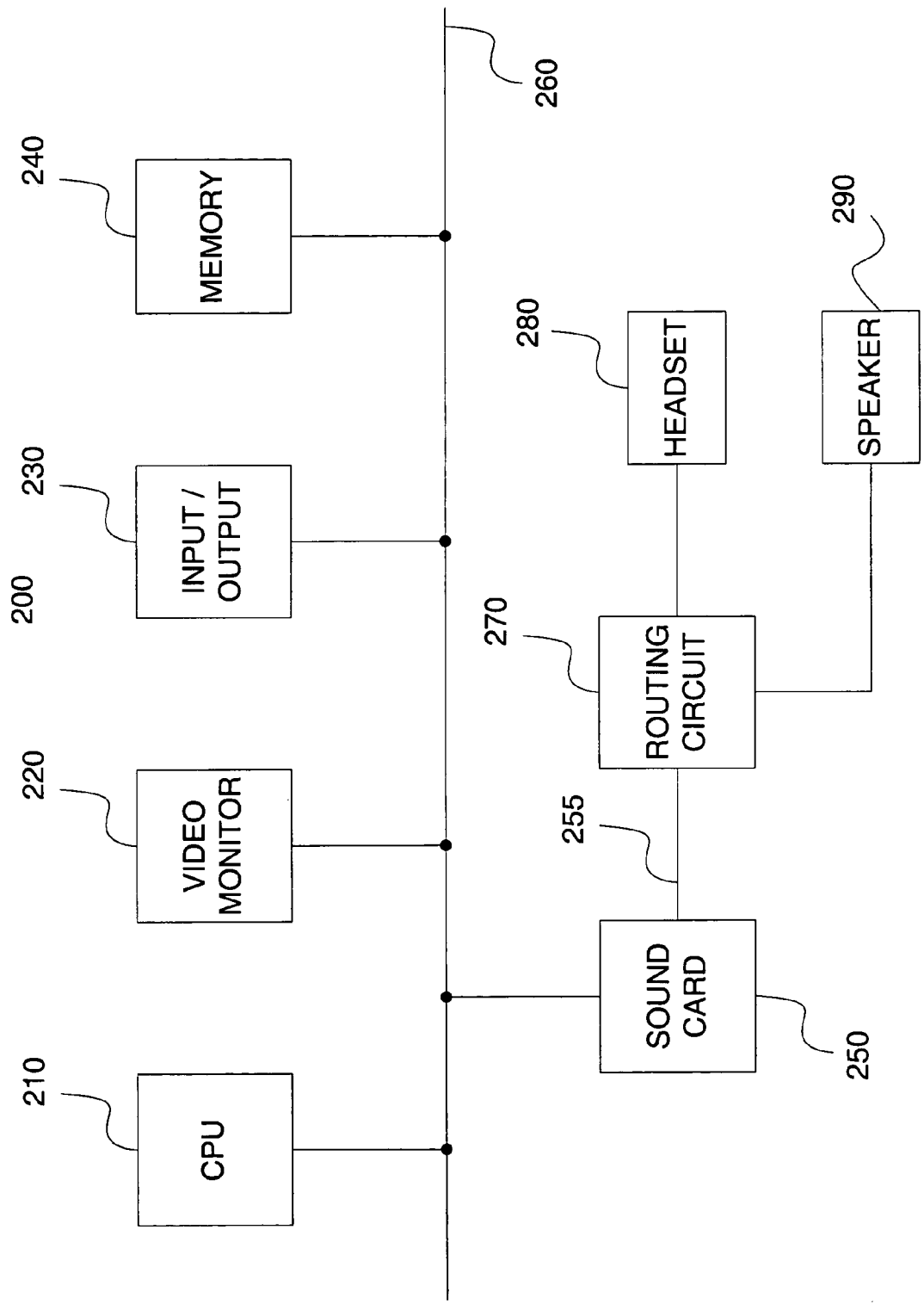
FIG. 2 is a block diagram of a computer system operative as a telephony device with a routing circuit according to the present invention.

FIG. 2 represents a computer system 200 equipped with a routing circuit for handling telephone ring signals according to the invention. System 200 preferably includes a Central Processing Unit (CPU) 210, a video monitor 220, an input/output interface 230, memory 240, and a soundcard 250 all inter-connected by a bus 260, and further includes the routing circuit 270 of the invention, a headset 280 and an amplified speaker 290. Bus 260 supplies analog or digital signals to soundcard 250, which outputs analog signals on line 255 to routing circuit 270, which in turn detects incoming calls and routes ring signals.

Figure 3:
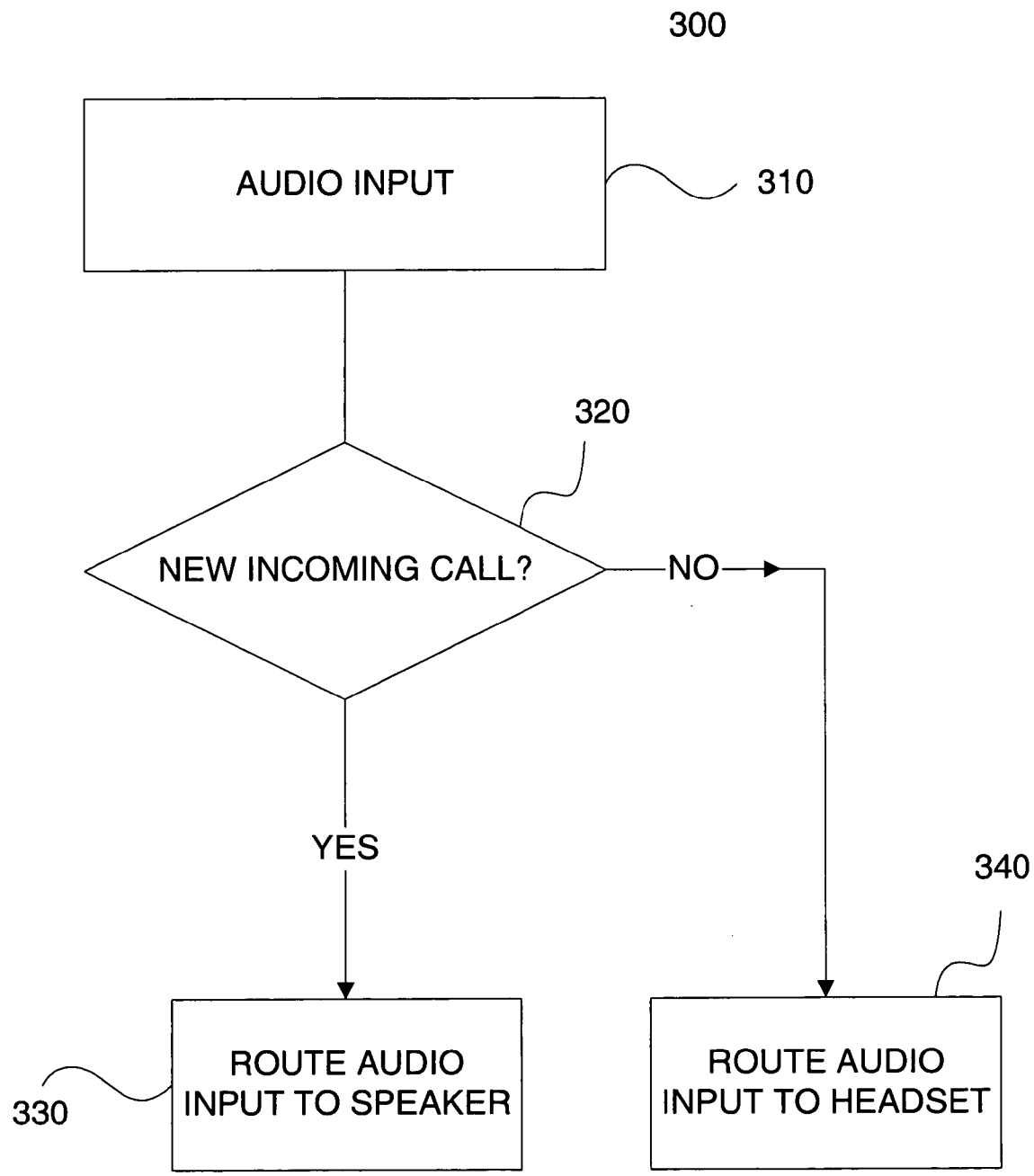
FIG. 3 is a flowchart of the operation of the routing circuit.

FIG. 3 is a flowchart of the invention's operation in filtering and diverting incoming call ring signals to a loudspeaker 290. In step 310 an audio input signal is received (on FIG. 2 line 255). Step 320 determines whether the input signal is a ring signal, indicating a new call. If so then step 330 routes the input signal to an amplifier and speaker 290 to alert the recipient. Alternatively, when the input signal is not a ring signal then step 340 routes the input signal to the headset 280.

The invention can be embodied by hardware, software or firmware, and can be configured various ways in each of those media. The preferred embodiment, discussed below in conjunction with FIGS. 4–7, comprises a hardware circuit which searches the output of soundcard 250 for two selected frequencies.

Figure 4:
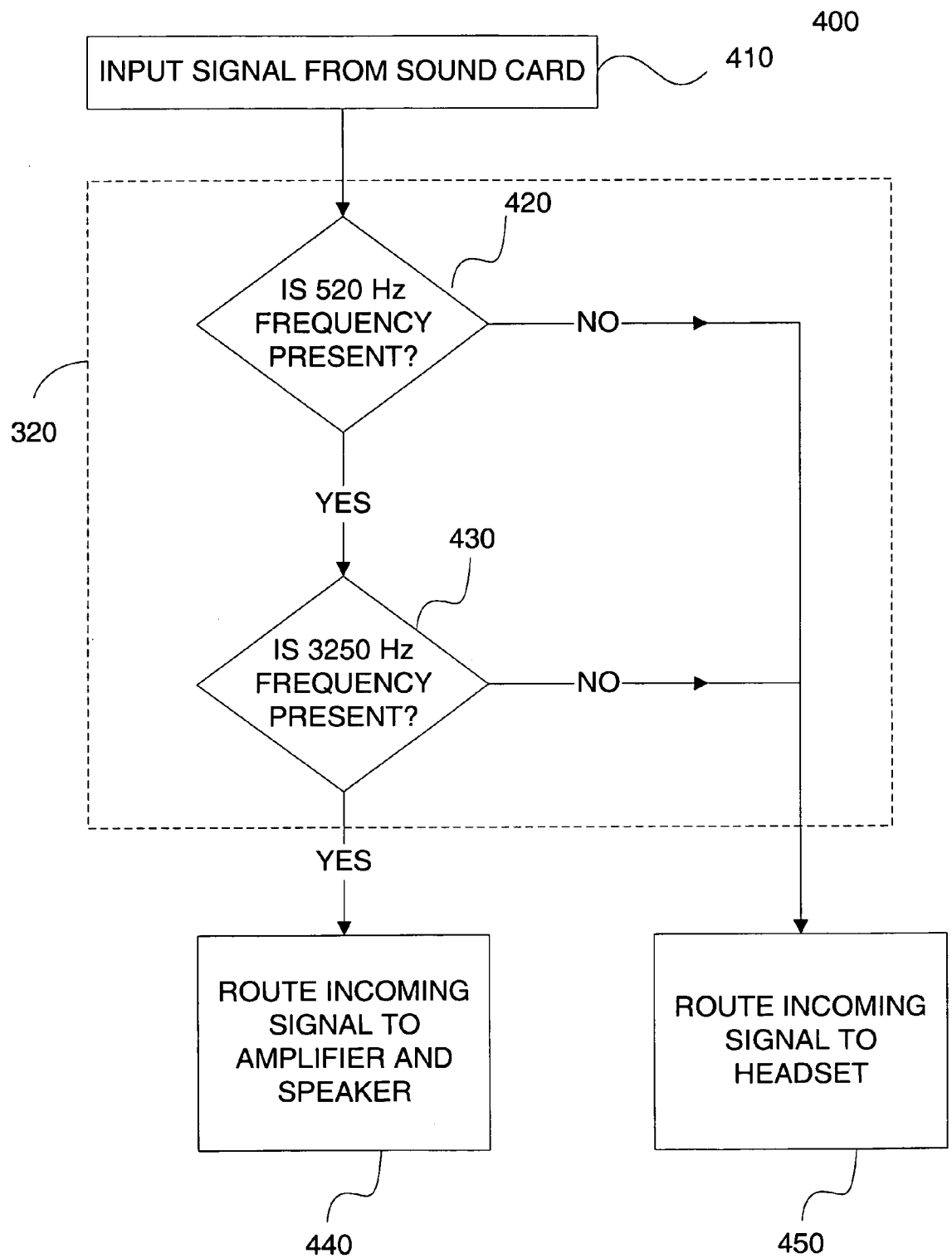
FIG. 4 is a flowchart showing specifics of step 320 of FIG. 3.

FIG. 4 is a flowchart detailing sub-steps of FIG. 3 step 320 in a preferred process 400 for identifying a ring signal from two specific frequencies. Initially, in a first step 410 the circuit receives an audio signal input (via bus 255) from the soundcard. This input signal is then, in steps 420 and 430, checked for the presence of the two selected characteristic frequencies, 520 Hz and 3250 Hz. Either frequency may be checked first, or the frequencies may be checked simultaneously. If either frequency is not present then the incoming signal must not be a ring signal and therefore, in step 450, is routed to the headset 280. If the two frequencies are present simultaneously then in step 440 the incoming ring signal is routed to an amplifier (not shown) and a speaker 290.

Figure 5:
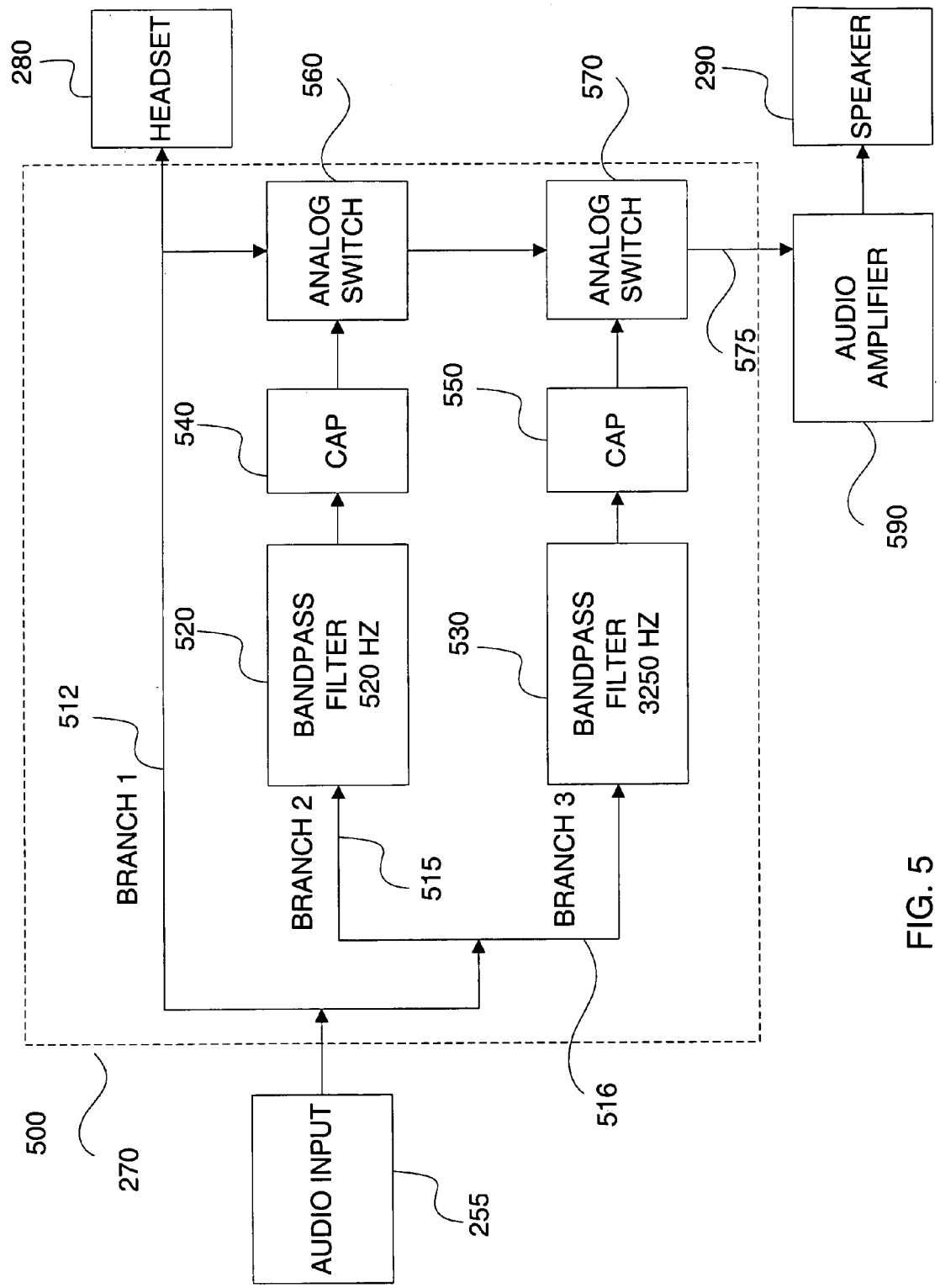
FIG. 5 is a block diagram of the routing circuit of FIG. 2.

FIG. 5 is a block diagram of the ring signal detection circuit 270 in the preferred embodiment, which includes an audio input on line 255, two bandpass filters 520 and 530, two capacitors 540 and 550, two analog switches 560 and 570, a headset 580, an audio amplifier 590 and a speaker 290.

The audio input signal is taken from the soundcard 250 output 255 and divided into three branches 512, 515 and 516. The first branch 512 is a bypass branch which carries the complete original unfiltered signal. The second branch 515 and third branch 516 include respective frequency bandpass filters 520 and 530, each of which passes a different frequency from the input signal.

The criteria for the selection of bandpass filter frequencies are that the filtered input signal frequencies be characteristic of the telephone ringing sound, and that two frequencies be far enough apart to be easily distinguishable, to minimize the number of false detections. Bandpass filters are constructed of a low pass filter and a high pass filter connected in series, so it is difficult and expensive to build one with a narrow band, and more so for an arbitrary specific frequency. Selecting two frequencies which are far apart reduces the likelihood that either bandpass filter will pass both frequencies and cause false detects.

Since a telephone ring signal typically contains the two frequencies 520 Hz and 650 Hz along with harmonics of these frequencies, two of these frequencies can identify ring signals for incoming calls. The two bandpass filters 520 and 530 selected are preferably 520 Hz and 3250 Hz, which correspond to the fundamental of the 520 Hz signal and to the fifth harmonic of the 650 Hz signal. This wide spacing between the two selected frequencies loosens specifications and makes it less expensive to manufacture the filters.

A bandpass filter passes only signals within its specified frequency range. If the audio signal input on line 255 contains frequencies within this specified range, those frequencies will be passed, while frequencies outside this range will be blocked. Signals which pass bandpass filters 520 and 530 are applied to, and charge, respective capacitors 540 and 550. Capacitors 540 and 550 are used to filter false detects, because conversations, noise and other sounds in the audio input besides ring signals can have the same frequency, but normally have briefer durations. However, telephone ring signals have a known duration, and a capacitor and time constant can be chosen to prevent the capacitor from being fully charged by signals which are too short. Thus, noise which slips through the bandpass filters 520 or 530 is filtered by capacitors 540 and 550. If filtered signals persist longer than the time constant of the circuit, then the signals proceed to the respective analog switches 560 and 570.

When the series-connected analog switches 560 and 570 both receive an input signal, they pass the complete unfiltered signal from branch 512 to the amplifier 590 and speaker 290.

Figure 6:
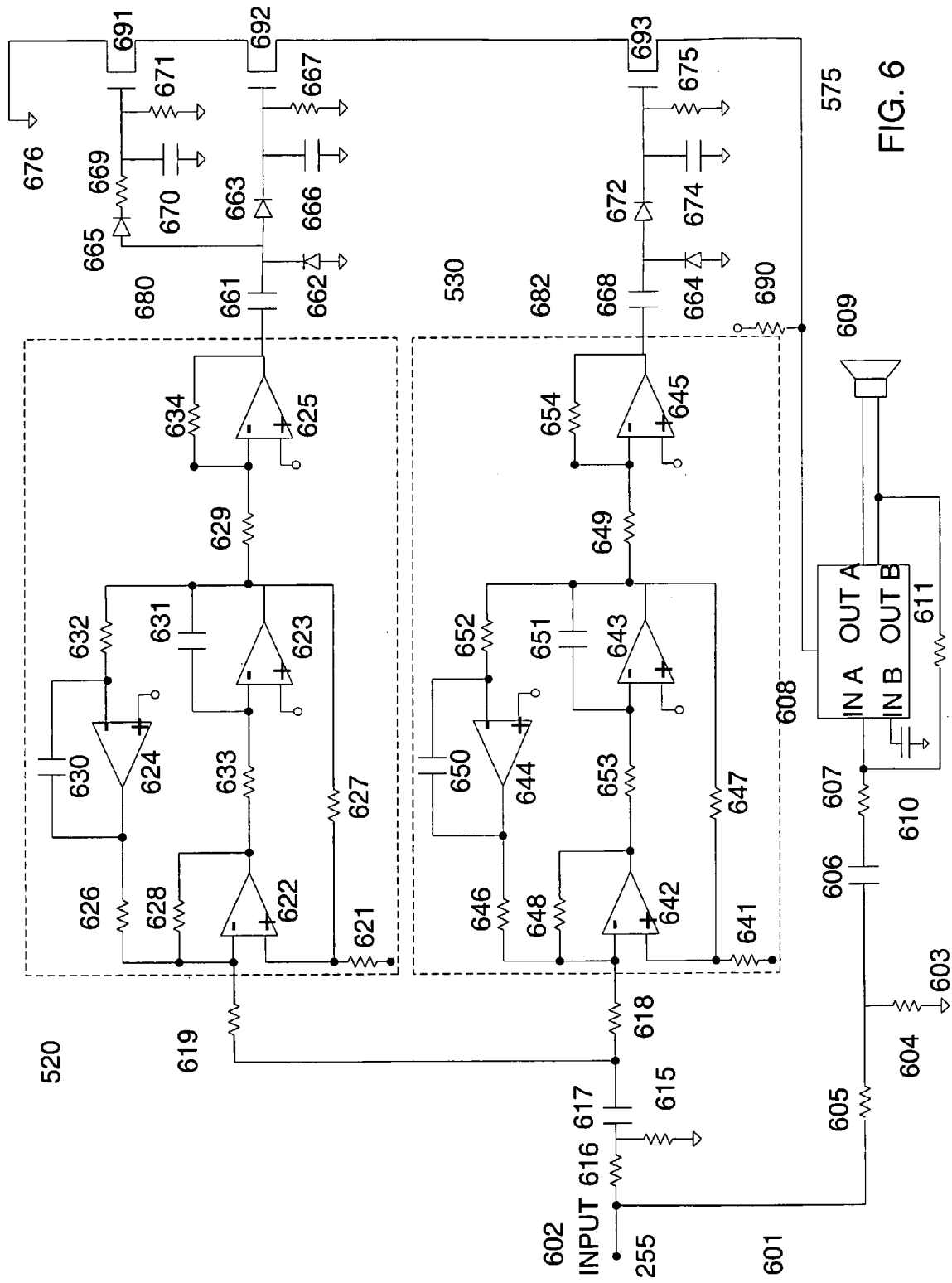
FIG. 6 is a circuit diagram showing details of FIG. 5.

FIG. 6 shows details of the preferred circuit 600 components from FIG. 5. The input signal on line 255 enters the circuit 600 and is split into two branches. The first branch 601, which is grounded through a 20 KΩ resistor 604 to common 603, carries the signal through a 20 KΩ resistor 605, a 0.39 μF capacitor 606, another 10 KΩ resistor 607, an audio operational amplifier 608 with a shutdown control pin and finally to a speaker 609. The audio operational amplifier 608 has an input on line 675 coming from the analog switches for the shutdown control, is grounded to common through a 1 μF capacitor 610, and is bypassed with a 96 KΩ resistor 611.

The input signal on path 602 is also grounded through a 20 KΩ resistor 615 to common and passes through a 30 KΩ resistor 616 and a 1 μF capacitor 617 before being split into second branch 619 and third branch 618. Both branches 619 and 618 carry the signal through respective 316 KΩ resistors before entering their respective bandpass filters 520 and 530. The bandpass filters are connected through respective 604 Ω resistors 621 and 641 to a 2.5 volt source. Bandpass filter 520 includes four operational amplifiers 622, 623, 624 and 625 having one input set at 2.5 volts, two 100 KΩ resistors 626 and 627, two 10 KΩ resistors 628 and 629, two 1000 pF capacitors 630 and 631, two 15.45 KΩ resistors 632 and 633 and one 51 KΩ resistor 634. Bandpass filter 530 includes four operational amplifiers 642, 643, 644 and 645 having one input set at 2.5 volts, two 100 KΩ resistors 646 and 647, two 10 KΩ resistors 648 and 649, two 1000 pF capacitors 650 and 651, two 96.6 KΩ resistors 652 and 653 and one 62 KΩ resistor 654.

The two branches 520 and 530 have output lines 680 and 682 which carry their signals through 1 μF capacitors 661 and 668 respectively and then are grounded to common through inverters 662 and 664, respectively.

At this point, branch 520 is split into a branch which carries the signal through rectifier 663 and on a path grounded to common in two places (by a 1 μF capacitor 666 and a 43 KΩ resistor 667) to analog switches 691 and 692, and on a branch through rectifier 665 on a path which has a 120 KΩ resistor 669 and is grounded to common in two places (by a 1 μF capacitor 670 and by a 470 KΩ resistor 671).

Branch 530 carries the signal through a rectifier 672 to an analog switch 693 through a path which is grounded to common in two places through a 1 μF capacitor 674 and a 120 KΩ resistor 675. When the analog switches 691, 692 and 693 are activated, the shutdown control of the audio operational amplifier 608 which is normally maintained at 5 volts through a 10 KΩ resistor 675 is grounded to common, thus activating the speaker 609.

Figure 7:
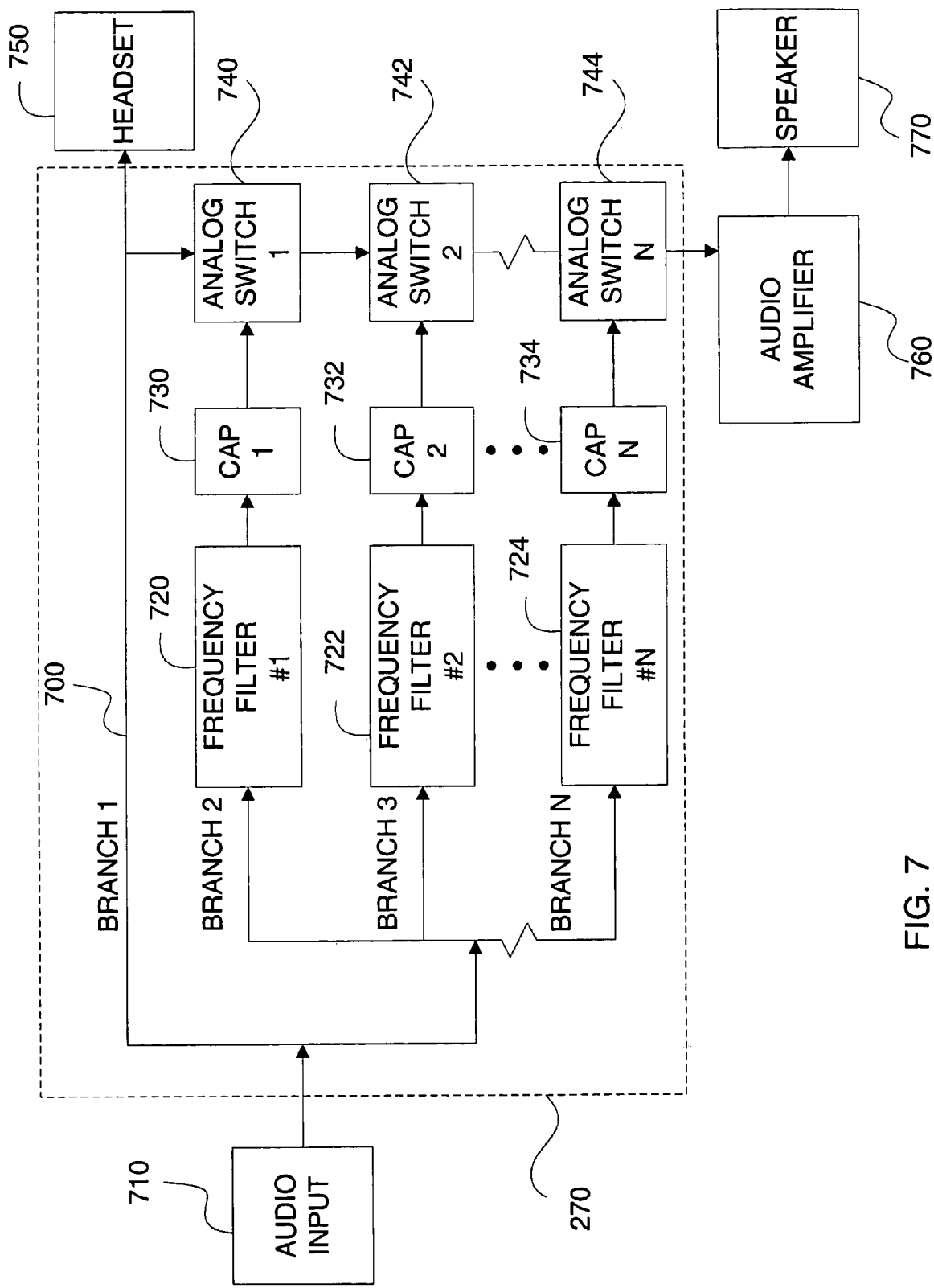
FIG. 7 is a block diagram showing a generalized version of the FIG. 5 circuit.

FIG. 7 is a block diagram of a generalized ring detection circuit, which includes an audio input 710, a number N of frequency filters 720, 722 and 724, a number N of capacitors 730, 732 and 734, a number N of analog switches 740, 742 and 744, a headset 750, an audio amplifier 760 and a speaker 770, where the number N can be any integer greater than or equal to one. The preferred embodiment discussed above and illustrated in FIG. 4 and FIG. 5 is a special case (N=2) of this generalized embodiment. A circuit designed with N=1 would contain one frequency filter 720, one capacitor 730 and one analog switch 740. The frequency filter could be a bandpass filter, low pass filter or high pass filter depending on the application. In such a circuit the detection of one frequency would be sufficient to identify an incoming call. A circuit designed with N=5 would contain five frequency filters, five capacitors and five analog switches. In such a circuit the detection of five frequencies would be necessary to identify an incoming call.

There are other embodiments which can extract and amplify a ringing signal from an incoming telephone call which are similar to this invention but have not been discussed. Although the present invention achieves this process through the use of hardware such as switches and filters, similar results can be achieved through the use of software, firmware and hardware combinations. For example, the soundcard can be set up to output its frequencies to a CPU which can be programmed to search for specific frequencies and, when the correct frequencies are found, send a tone signal to the computer speaker. Since an Internet telephone works by transmitting wave packets, a data server can announce a new call by sending a specific wave packet which contains information other than frequency. In such a case the hardware, firmware and software would receive the signal, determine that it is an incoming call and command the speaker to make an announcement bypassing the headset.

The invention claimed is:

1. An Internet telephony device, comprising:
a first output device and a second output device, distinct from said first output device;
an input device constructed and adapted to receive an audio input signal, and
circuitry constructed and adapted to analyze said audio input signal,
wherein said circuitry is constructed and adapted to detect in said audio input signal a multi-frequency signal indicative of an incoming call, and automatically to send an output signal to a said first output device when said multi-frequency signal corresponding to an incoming call is detected, and otherwise to send said audio input signal to said second output device, wherein said circuitry comprises:
a plurality of frequency filters, each corresponding to a different frequency indicative of said multi-frequency signal, and each filter constructed and adapted to detect a different frequency indicative of said multi-frequency signal,
a plurality of capacitors, one corresponding to each of said plurality of frequency filters, each connected to a different one of said plurality of frequency filters, for filtering out signals having certain durations;
a plurality of switches connected in series, one corresponding to each of said plurality of frequency filters, each connected to a different one of said plurality of capacitors, for selectively causing said audio signal to be routed to the first output device when said frequency indicative of said multi-frequency signal are detected for a sufficient period of time by said plurality of frequency filters in conjunction with said plurality of capacitors, and otherwise causing said audio signal to be routed to said second output device.

2. The device of claim 1, wherein said plurality of frequency filters are comprise bandpass filters.

3. The devise of claim 1,
a wherein said plurality of capacitors filter noise in said audio input signal to prevent false detects of incoming telephone calls.

4. A device method as claim 1 wherein said first output device is a speaker and wherein said second output device is a headset.

5. A device as in claim 1 wherein the multi-frequency signal comprises 520 Hz and 650 Hz signals.

6. A device as in claim 1 wherein the multi-frequency signal comprises a ring signal.

7. A device as in claim 1 wherein said logic circuitry detects the presence of at least two distinct simultaneous frequencies for a duration indicative of said multi-frequency signal.

8. A device as in claim 1 wherein said first output device is a speaker.

9. A device as in claim 1 wherein said second output device is a headset.

10. A device as in claim 1 wherein said first output device and said second output device are selected from the group comprising: a speaker and a headset.

11. A device as in claim 1 wherein at least one of the plurality of frequency filters corresponds to a harmonic of a frequency of a signal in the multi-frequency signal.

12. An Internet telephony device, comprising:
an input device constructed and adapted to receive an audio input signal, and
logic circuitry constructed and adapted to analyze a central processing unit with logic for analyzing said audio input signal, wherein said logic circuitry detects in said audio input signal the presence of at least two distinct simultaneous frequencies for a duration indicative of a multi-frequency signal indicative of an incoming call, the multi-frequency signal comprising 520 Hz and 650 Hz signals;
wherein said circuitry detects in said audio input signal said multi-frequency signal in said audio input signal, and sends an output signal to a first output device when said multi-frequency signal corresponding to an incoming call is detected, and otherwise sends said audio input signal to a second output device, distinct from said first output device, when said signal corresponding to an incoming call is not detected, wherein said first output device and said second output device are selected from the group comprising:
a speaker and a headset, and
wherein said circuitry comprises:
a plurality of bandpass filters, each corresponding to a different frequency indicative of said multi-frequency signal, each filter constructed and adapted to detect a different frequency indicative of said multi-frequency signal,
a plurality of capacitors, one corresponding to each of said plurality of frequency filters, each capacitor connected to a different one of said plurality of frequency filters, said capacitors for filtering out signals having certain durations;
a plurality of switches connected in series, one corresponding to each of said plurality of frequency filters, each connected to a different one of said plurality of capacitors, for selectively causing said audio signal to be routed to said first output device when said frequency indicative of said multi-frequency signal are detected for a sufficient period of time by said plurality of frequency filters in conjunctions with said plurality of capacitors, and otherwise causing said audio signal to be routed to said second output device.

13. A device as in claim 12 wherein the multi-frequency signal comprises a ring signal.

14. An Internet telephony device, comprising:
an input device constructed and adapted to receive an audio input signal, and
logic circuitry constructed and adapted to analyze a central processing unit with logic for analyzing said audio input signal, wherein said logic circuitry detects in said audio input signal the presence of at least N distinct simultaneous frequencies for a duration indicative of a multi-frequency signal indicative of an incoming call, where $N \geq 2$;
wherein said circuitry detects in said audio input signal said multi-frequency signal in said audio input signal, and sends an output signal to a first output device when said multi-frequency signal corresponding to an incoming call is detected, and otherwise sends said audio input signal to a second output device, distinct from said first output device, when said signal corresponding to an incoming call is not detected, and
wherein said circuitry comprises:
at least N frequency filters, each corresponding to a different frequency indicative of said multi-frequency signal, each filter constructed and adapted to detect a different frequency indicative of said multi-frequency signal,
at least N Capacitors, one corresponding to each of said plurality of frequency filters, each capacitor connected to a different one of said plurality of frequency filters, said capacitors for filtering out signals having certain durations;

at least N switches connected in series, one corresponding to each of said plurality of frequency filters, each connected to a different one of said plurality of capacitors, for selectively causing said audio signal to be routed to said first output device when said frequency indicative of said multi-frequency signal are detected for a sufficient period of time by said plurality of frequency filters in conjunctions with said plurality of capacitors, and otherwise causing said audio signal to be routed to said second output device.

15. A device as in claim 14 wherein said first output device and said second output device are selected from the group comprising: a speaker and a headset.

16. A device as in claim 14 wherein the multi-frequency signal comprises 520 Hz and 650 Hz signals.

17. A device as in claim 16 wherein one of the plurality of frequency filters corresponds to the fundamental of the 520 Hz signal and another of the plurality of frequency filters corresponds to a fifth harmonic of the 650 Hz signal.

18. A device as in claim 14 wherein the multi-frequency signal comprises a ring signal.

19. A device as in claim 14 wherein the frequency filters comprise bandpass filters.

20. A device as in claim 14 where N=2.

21. A device as in claim 14 where the value is N is selected from the numbers 2, 3, 4 and 5.

22. An Internet telephony device, comprising:
an input device for receiving constructed and adapted to receive an audio input signal, and
logic circuitry constructed and adapted to analyze a central processing unit with logic for analyzing said audio input signal, wherein said logic circuitry detects in said audio input signal the presence of two distinct simultaneous frequencies for a duration indicative of a multi-frequency signal indicative of an incoming call;
wherein said circuitry detects in said audio input signal said multi-frequency signal in said audio input signal, and sends an output signal to a first output device when said multi-frequency signal corresponding to an incoming call is detected, and otherwise sends said audio input signal to a second output device, distinct from said first output device, when said signal corresponding to an incoming call is not detected, and
wherein said circuitry comprises:
two frequency filters, each corresponding to a different frequency indicative of said multi-frequency signal, each filter constructed and adapted to detect a different frequency indicative of said multi-frequency signal,
two capacitors, one corresponding to each of said plurality of frequency filters, each capacitor connected to a different one of said plurality of frequency filters, said capacitors for filtering out signals having certain durations;
two switches connected in series, one corresponding to each of said plurality of frequency filters, each connected to a different one of said plurality of capacitors, for selectively causing said audio signal to be routed to said first output device when, said frequency indicative of said multi-frequency signal are detected for a sufficient period of time by said plurality of frequency filters in conjunctions with said plurality of capacitors, and otherwise causing said audio signal to be routed to said second output device.

23. A device as in claim 22 wherein the multi-frequency signal comprises a ring signal.

24. A device as in claim 22 wherein the multi-frequency signal comprises 520 Hz and 650 Hz signals.

25. A device as in claim 24 wherein one of thy two frequency filters corresponds to the fundamental of the 520 Hz signal and the other of the two frequency filters corresponds to a fifth harmonic of the 650 Hz signal.

26. A device as in claim 22 wherein the frequency filters comprise bandpass filters.

27. A device as in claim 22 wherein one of the plurality of frequency filters corresponds to a harmonic of a frequency of a signal in the multi-frequency signal.

* * * * *